2,629,571

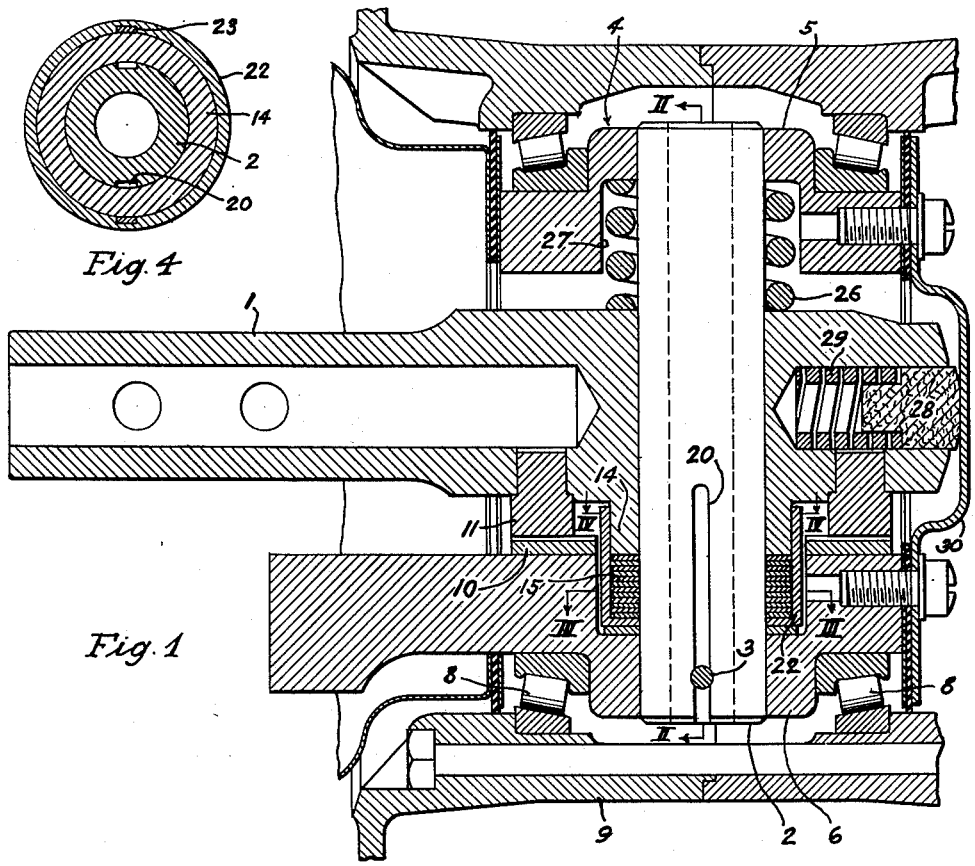
Fig. 4
Fig. 1
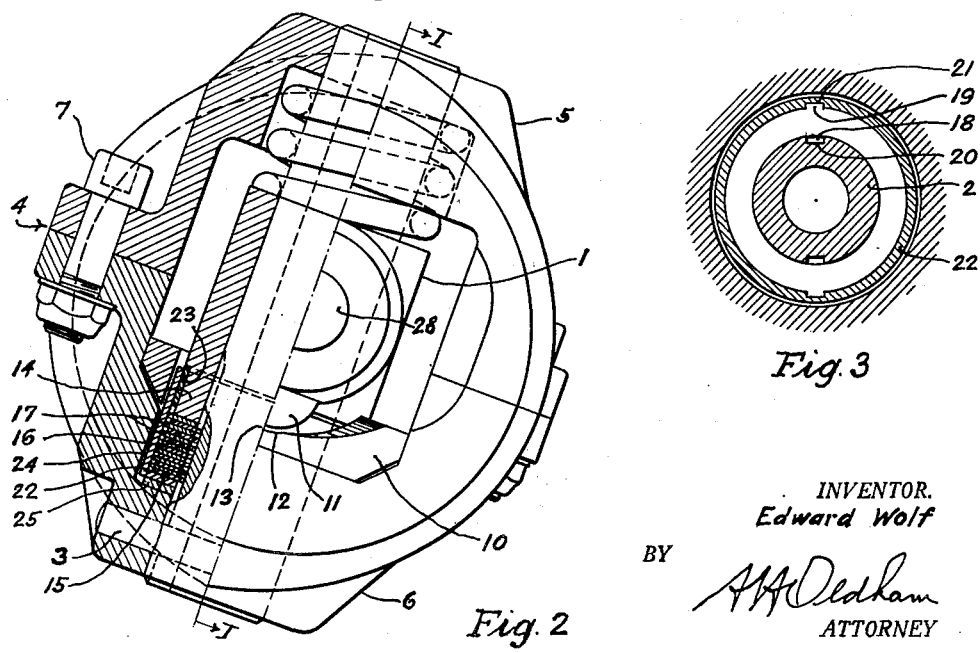
Fig. 2
Fig. 3
INVENTOR.
Edward Wolf
BY
A. H. Oldham
ATTORNEY Patented Feb. 24, 1953

UNITED STATES PATENT OFFICE 2,629,571

FRICTION TAXI LOCK FOR AIRPLANE CROSS-WIND MAIN LANDING WHEELS

Edward Wolf, Cuyahoga Falls, Ohio, assignor to Goodyear Aircraft Corporation, Akron, Ohio, a corporation of Delaware Application August 17, 1951, Serial No. 242,298

3 Claims. (Cl. 244—103)

1

This invention relates to airplane cross-wind main landing wheels of the type shown in Patent No. 2,504,077, issued to Oscar W. Loudenslager, and in particular to a taxi lock therefor.

Under normal conditions it is desirable that in taxiing and ground handling casterable main landing wheels of an airplane are locked or restricted from castering, however, to permit castering of these wheels when excessive side loads are placed upon the airplane such as are encountered in drift (cross-wind) landings.

Hitherto it has been known to provide the centering cam of cross-wind landing wheels with a special notch to hold the wheels in center or neutral position by means of the cam followers to prevent them from undesirable castering. However, it has been found that such a notch into which the cam follower is placed is, under certain conditions, not quite satisfactory and that a more positive means should be provided.

It is the general object of the invention to avoid and overcome the foregoing and other difficulties to prior art practices by the provision of brake means which hold the wheels fixed in neutral position by the airplane weight, however without placing load on the cam in such wheel position.

Another object of this invention is to determine the braking force for holding the wheels in neutral position so that at excessive side loads the wheel will overcome the brake friction and caster, whereby the airplane load is taken over by the centering cam which then acts upon the wheel in the usual manner.

The aforesaid objects of the invention, and other objects will become apparent as the description proceeds, are achieved by providing a laminated disk brake concentric to the king pin about the axis of which the landing wheel is casterable. With a suitable number of disks the desired friction is obtained to lock the wheel in center position when the airplane load rests on the wheels. In this position the centering cam is made ineffective by a notch which spaces the cam followers from the cam, however, as soon as the wheel casters the airplane load is transferred from the brake to the cam which, then, takes over its normal function.

For a better understanding of the invention reference shall be had to the accompanying drawing, wherein Fig. 1 is a fragmentary vertical cross-sectional front view taken in line I—I of Fig. 2 of one embodiment of the invention, Fig. 2 is a side view of the wheel hub with bearings omitted, one half being in cross-section taken on line II—II of Fig. 1, Fig. 3 is a cross-sectional view taken on line III—III of Fig. 1, and Fig. 4 is a cross-sectional view taken on line IV—IV of Fig. 1, with specific reference to the form of the invention illustrated in the drawing; the numeral 1 indicates a landing wheel axle adapted to be attached to an airplane substructure and through which axle slidably and pivotally passes a king pin 2 which is mounted at an angle with the vertical and with the king pin 2 being secured by a pin 3 in a split hollow wheel hub 4 consisting of an upper part 5 and a lower part 6 fastened together by bolts 7. The hub radially spaced from the axle 1 carries bearings 8 which rotatably support the landing wheel 9. For centering the casterable wheel 9, a cam 10, upon which rides a pair of cam followers 11 extending from the bottom of the axle, is seated within and at the bottom of the lower hub part 6. The center of cam 10 is provided with a notch 12 which serves to provide a clearance 13 between the cam followers and the cam when the landing wheel is in neutral or center position. In this position the axle 1 rests with its downwardly extending cylindrical portion 14 against a disk brake 15 consisting of alternate layers of steel disks 16 and brass disks 17 which are provided respectively, with inwardly and outwardly extending lugs 18 and 19 that are held in grooves 20 and 21 in the king pin 2 and in the flanged collar 22, respectively. This collar is slidable along the cylindrical axle portion 14 provided with keys 23 fixed thereto to prevent turning of collar 22 relative axle portion 14. The collar 22, inserted in a cylindrical socket 24 in the lower hub part 6, bears against a steel disk 25 taking up wear. A spring 26 inserted in a socket 27 in the upper hub part 5 serves to hold in continuous contact cam 10 with cam followers 11, and the axle extension 14 with the disk brake 15, as the case may be. A button 28 loaded by a spring 29 is provided for frictional engagement with a drum segment 30 fastened to the wheel hub 4 to reduce or prevent wheel shimmying.

In operating the invention, it will be seen that when the airplane on the ground runs straight ahead its load is transmitted only to the brake disks which under reasonably normal ground conditions will prevent castering of the landing wheels. However, when excessive side forces acting upon the airplane overcome the brake friction the wheels start to caster whereby the airplane load is transferred from the brake disks to the centering cam for regular castering movement. The brake friction is determined by the airplane load and the number of brake disks which will be needed to produce the desired friction. After the brake requirements have once been determined for a particular airplane type, the brake will give uniform and dependable service. As soon as the airplane leaves the ground with the wheels in castered position the spring between hub and axle will force the wheel back to neutral position.

From the foregoing description and illustration of one embodiment of the invention it will be understood that the objects have been achieved of locking at ground maneuvers the landing wheels in neutral position and to unlock them for castering, in case excessive side forces act upon the airplane as, for instance, in crosswind landings.

While certain representative embodiments and details have been shown for the purpose of illustrating the invention, it will be apparent to those skilled in this art that various changes and modifications may be made therein without departing from the spirit or scope of the invention.

What is claimed:

1. In combination with an airplane cross-wind main landing wheel rotatable about a casterable hub, a king pin diametrically disposed and fixed in said hub, a spring loaded axle passing through and being radially spaced from said hub with the king pin passing pivotally and slidably through said axle, a pair of cam followers extending downwardly from said axle, a centering cam seated in said hub below the cam followers and being provided with a notch in alignment with but vertically spaced from the cam followers when the landing wheel is in neutral position and in frictional contact with the cam followers when the landing wheel assumes a castered position, and frictional locking means mounted in said hub concentrically to the king pin, said locking means being subjected to the load of the airplane on the ground when the wheels are in substantially neutral position and the load being transferred from said locking means to the cam when the wheel casters due to an excessive side force against the wheel.

2. In an airplane main landing wheel rotatable about a casterable hub surrounding a spring loaded axle radially spaced therefrom, a king pin placed diametrically and in fixed position in said hub and being pivotable and slidable in said axle, a pair of cam followers extending downwardly from said axle, a centering cam provided with a transverse notch aligned with said cam followers to space them from said cam when said wheel is in neutral position and in frictional cooperation with said cam when said wheel is in castered position, and a laminated friction lock mounted concentrically to said king pin in the lower portion of said hub and being in pressure contact with the axle to lock the wheel against castering in substantially neutral position during airplane ground maneuvers and to release the wheel for castering by cam action when excessive side forces act thereupon.

3. In an airplane main landing wheel rotatable about a casterable hub surrounding a spring loaded axle which is radially spaced therefrom and provided with an annular downward extension including a pair of keys, a king pin having a pair of key ways at its lower end and being placed diametrically and in fixed position in said hub and being pivotable and slidable in said axle, a pair of cam followers extending downwardly from said axle, a centering cam provided with a transverse notch aligned with said cam followers to space them from said cam when said wheel is in neutral position and in frictional cooperation with said cam when said wheel is in castered position, a longitudinally slidable flanged collar having a pair of opposite inside key ways for engaging said axle extension keys and being seated in the lower portion of said hub, and a plurality of friction disks alternately provided with inner and outer lugs, respectively, engaging the keyways in said king pin and said collar, said disks being compressed in airplane ground maneuvers to lock said wheel in substantially neutral position against castering and released from pressure by cam action for castering the wheel when excessive side forces act thereupon.

EDWARD WOLF.

REFERENCES CITED

The following references are of record in the file of this patent:

UNITED STATES PATENTS

| Number | Name | Date |
|---|---|---|
| 2,333,550 | Parker | Nov. 2, 1943 |
| 2,504,077 | Loudenslager | Apr. 11, 1950 |